Oct. 28, 1924.
N. J. A. WAHLBERG
EXPANSION BOLT
Filed March 31, 1920
1,513,301
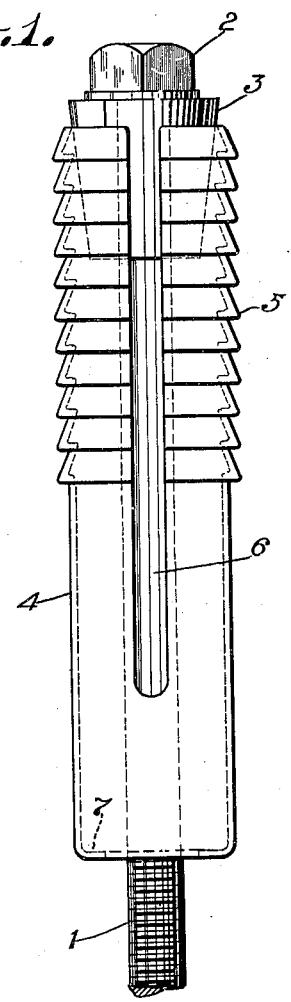
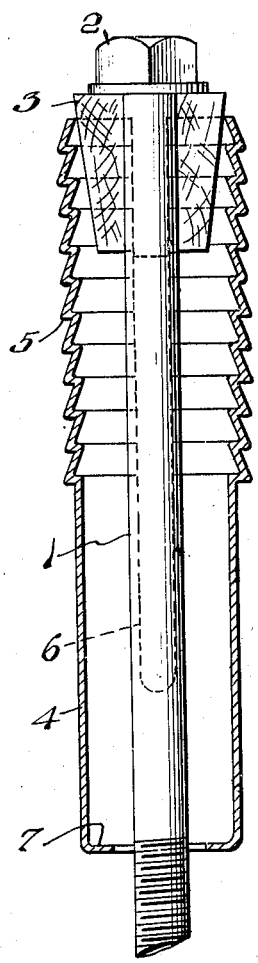
INVENTOR
Nils J. A. Wahlberg Patented Oct. 28, 1924.

1,513,301

UNITED STATES PATENT OFFICE.

NILS J. A. WAHLBERG, OF WILKINSBURG, PENNSYLVANIA, ASSIGNOR TO WESTINGHOUSE ELECTRIC & MANUFACTURING COMPANY, A CORPORATION OF PENNSYLVANIA.

EXPANSION BOLT.

Application filed March 31, 1920. Serial No. 370,060.

*To all whom it may concern:*

Be it known that I, NILS J. A. WAHLBERG, a citizen of the United States, and a resident of Wilkinsburg, in the county of Allegheny and State of Pennsylvania, have invented a new and useful Improvement in Expansion Bolts, of which the following is a specification.

My invention relates to holding devices and particularly to expansion bolts.

One object of my invention is to provide a device of the above indicated character that shall be simple and durable in construction, economical to manufacture and effective in operation.

Another object of my invention is to provide an expansion-bolt device that shall be free of cast-metal parts requiring coring, finishing and other comparatively difficult and expensive operations.

Another object of my invention is to provide an expansion-bolt device in which a pressed-metal expansible sleeve and a frusto-conical plug of yieldable material shall be so related and frictionally-engaged as to permit the adjustable expansion and contraction of the sleeve and to hold the sleeve in adjusted position.

In practicing my invention, I provide an ordinary bolt having a nut or integral head thereon. A frusto-conical sleeve or plug of yieldable material, such as wood, is mounted on the bolt, with its larger base disposed adjacent to the nut or head. An elongated sleeve or cylinder of relatively thin material, preferably pressed metal, is disposed on the bolt with one end perimeter engaging the plug at a position intermediate the ends of the latter and has a longitudinal slot or slots extending through its walls from the plug to a position intermediate the ends of the cylinder. An inwardly projecting annular flange at the other end of the cylinder serves to position the cylinder symmetrically with respect to the bolt.

Figure 1 of the accompanying drawings is a side elevational view of an expansion-bolt device embodying my invention; and Fig. 2 is a longitudinal sectional view of the device shown in Fig. 1.

A bolt 1, having an integral head or a nut 2 thereon, is embraced, near the head, by a frusto-conical plug or wedge member 3, preferably of wood, disposed with its larger base adjacent to the head. A cylindrical sleeve 4, preferably of relatively thin pressed metal, having a serrated or corrugated portion 5, a slot or slots 6 extending from one end to a position intermediate its ends and an inwardly-projecting annular flange 7 at its other end, is disposed on the bolt with its slotted-end perimeter embracing an intermediate portion of the plug 3.

When the plug or wedge member 3 is forced into the sleeve 4, the latter will expand to engage its corrugated portion 5 against the sides of an apertured support or member (not shown) in which the device may be placed. When thus expanded, the end edges of the sleeve 4 are slightly depressed into the plug or wedge member 3 to effect a firm gripping relation therewith.

The device is constructed of easily workable material of simple forms, thus reducing the expense and labor connected with its manufacture, is rugged and durable in construction and effective in operation.

While I have shown and described a particular form of my invention, changes may be effected therein without departing from the spirit and scope thereof, as set forth in the appended claims.

I claim as my invention:

1. An expansion-bolt device comprising a bolt, an expansible pressed metal sleeve embracing the bolt and provided with annular corrugations forming exterior and interior gripping surfaces, and a frusto-conical plug embracing the bolt inside the sleeve and movable with respect to the latter.

2. An expansion-bolt device comprising a headed bolt, a hollow frusto-conical plug embracing the bolt adjacent to the head of the bolt, and a longitudinally slotted pressed metal sleeve embracing the bolt and the plug and provided with an annular corrugation forming exterior and interior gripping surfaces.

3. An expansion-bolt device comprising a headed bolt, a hollow frusto-conical plug embracing the bolt adjacent to the head of the bolt, and an expansible pressed metal sleeve surrounding the bolt and having one end perimeter engaging and embracing the plug, said sleeve having interior corrugations forming a series of integral frusto-conical gripping surfaces.

4. An expansion-bolt device comprising a headed bolt, a hollow frusto-conical plug embracing the bolt adjacent to the head of the bolt, a pressed metal sleeve surrounding the bolt having one end perimeter engaging and embracing the plug, said sleeve having a longitudinal slot from said end to a position intermediate its ends and provided with exterior and interior corrugations extending substantially around the sleeve.

5. An expansion-bolt device comprising a headed bolt, an expansible member supported by the bolt and a member of yieldable material disposed between the bolt adjacent the head thereof and said member and adapted to be indented and retained by the latter, for expanding and holding the latter in expanded position.

In testimony whereof, I have hereunto subscribed my name this 26th day of March 1920.

NILS J. A. WAHLBERG.